S. R. CREWS.
SPRING TIRE FOR VEHICLES.
APPLICATION FILED SEPT. 2, 1911.
1,030,233.
Patented June 18, 1912.
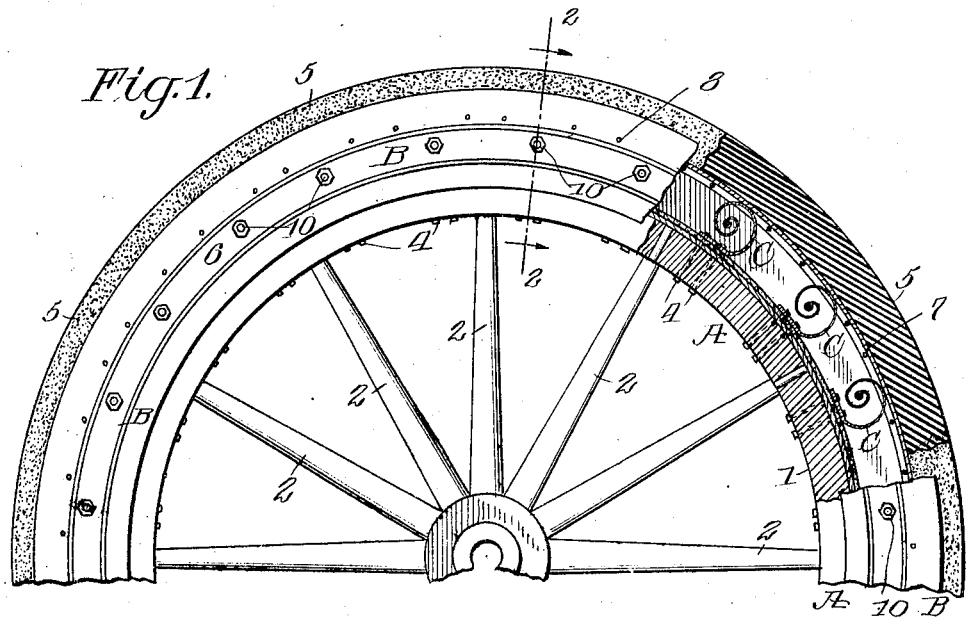
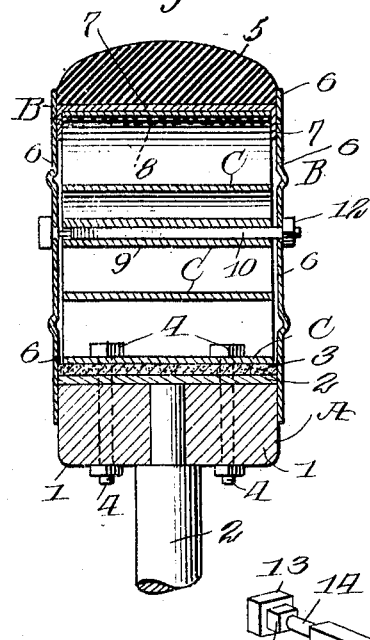
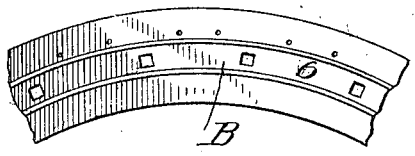
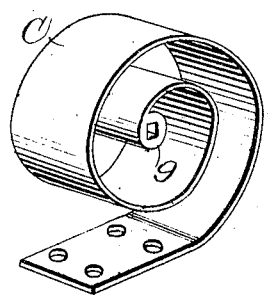
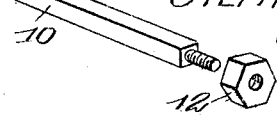
WITNESSES
Samuel E. Wade.
Chas. A. Pettit
INVENTOR
STEPHEN R. CREWS.
BY Munn & Co.
ATTORNEYS

UNITED STATES PATENT OFFICE.

STEPHEN ROSS CREWS, OF TAMPA, FLORIDA, ASSIGNOR OF ONE-HALF TO JOSIAH RICHARDSON, OF TAMPA, FLORIDA.

SPRING-TIRE FOR VEHICLES.

1,030,233.

Specification of Letters Patent. Patented June 18, 1912.

Application filed September 2, 1911. Serial No. 647,393.

*To all whom it may concern:*

Be it known that I, STEPHEN R. CREWS, a citizen of the United States, and a resident of Tampa, in the county of Hillsboro and State of Florida, have invented an Improvement in Spring-Tires for Vehicles, of which the following is a full description.

My invention has for its object to provide a practical, efficient, and durable spring-tire for autos and other motor vehicles in which metallic springs are substituted for pneumatic pressure.

The construction, arrangement, and combination of parts embodying the invention are as hereinafter described and illustrated in the accompanying drawing, in which—

Figure 1 is in part a side view and in part a section of a portion of the wheel embodying my invention. Fig. 2 is a transverse section on the line 2—2 of Fig. 1. Fig. 3 is a perspective view of the square transverse bolt to which the inner end of the coiled spring forming a part of the invention is secured. Fig. 4 is a perspective view of one of the springs. Fig. 5 is a side view of a portion of one of the annular side plates.

The wheel rim, regarded as a whole, is formed in two parts, one, A, being fixed concentrically with the hub of the wheel, and the other, annular part, B, being movable radially on the part A. Between these two parts A and B, and attached to both, are arranged a series of coiled springs C. The details of construction, arrangement, and combination are as follows: The part A is formed of a wood or iron felly 1 secured on the tenons of spokes. A steel rim 2 encircles such felly, and a layer or strip of rubber or some other equivalent material is laid upon the band 3. Upon this layer or packing 3 are secured the flat inner ends of shanks of the coiled springs C, by means of screw-bolts 4. The outer part B or rim proper is formed of an elastic solid tread 5 and parallel side plates 6 which are secured to the flanges of a rim 7 upon which the elastic tread is laid. The metallic rim 7 is secured to the side plates 6 by means of transverse bolts 10. The latter thus constitute the sides of the rim part B and their inner edges extend inward over a portion of the sides of the wooden felly 1 and are adapted to slide radially thereon and also, slightly circumferentially so far as permitted by the elasticity of the spring C. For the purpose of imparting greater strength to the side plates 6, they have one or more circumferential crimps or corrugations. It is apparent that the part B forms a circular trough-like inclosure for the immovable rim portion of the wheel, and is adapted to slide bodily in a radial direction, that is to say, toward or from the wooden felly 1 and also adapted for slight circumferential movement thereon. I am thus enabled to apply a punctureless tire having the same elastic quality as the more expensive pneumatic tires now generally used.

The outer ends of the coiled springs C are formed, as shown in Fig. 4, with a thickened part 9 having a square opening adapted to receive the squared portion of a bolt 10—see Fig. 3. The ends of said bolt are reduced and one is screw-threaded to receive a nut 12. The other end 13 of the bolt is squared and adjacent to it is a reduced round portion 14, and between such parts 13 and 14 is a reduced squared portion 15. By rotating the bolts 10, the tension of the springs C may be changed at will. To effect this, a wrench is applied to the bolt head 13, and another to nut 12, which is thus rotated until removed, which permits the bolt to be adjusted with the round part 14 in the square hole in the rim adjacent plate 6. Then the bolt is rotated and readjusted so that its squared portion 15 again enters the corresponding aperture in the rim plate.

What I claim is:—

In a spring wheel of the type indicated, the combination, with a fixed inner wheel rim and an outer concentric movable rim including parallel, annular, side plates extending radially inward and overlapping the fixed rim, said plates being provided with a series of polygonal apertures, of coiled springs interposed between the two rims and secured to the inner one, polygonal bolts passing transversely through the free ends of the springs, said bolts having two adjacent squared portions and a reduced rounded portion at one end, and a screw tenon at the other end, the inner one of the adjacent squared portions being adapted to fit in the polygonal apertures of the side plates, whereby the bolts are adapted to be adjusted lengthwise and rotated when it is required to change the tension of the springs, but in normal position and relation lock the springs with the side plates and hold them under any required degree of tension, substantially as described.

STEPHEN ROSS CREWS.

Witnesses:
  DOZIER A. DE VANE,
  EVA EMERSON.